US009247366B2

(12) United States Patent
Doller

(10) Patent No.: US 9,247,366 B2
(45) Date of Patent: Jan. 26, 2016

(54) MICROPHONE TEST FIXTURE

(71) Applicant: Robert Bosch GmbH, Stuttgart (DE)

(72) Inventor: Andrew J. Doller, Sharpsburg, PA (US)

(73) Assignee: Robert Bosch GmbH, Stuttgart (DE)

( * ) Notice: Subject to any disclaimer, the term of this patent is extended or adjusted under 35 U.S.C. 154(b) by 192 days.

(21) Appl. No.: 14/023,919

(22) Filed: Sep. 11, 2013

(65) Prior Publication Data

US 2014/0079228 A1  Mar. 20, 2014

Related U.S. Application Data

(60) Provisional application No. 61/701,127, filed on Sep. 14, 2012.

(51) Int. Cl.
H04R 29/00 (2006.01)
G01H 3/00 (2006.01)

(52) U.S. Cl.
CPC .............. *H04R 29/004* (2013.01); *G01H 3/005* (2013.01); *H04R 29/006* (2013.01)

(58) Field of Classification Search
CPC ..... H04R 29/004; H04R 29/006; G01H 3/005
USPC .......................................................... 381/58
See application file for complete search history.

(56) References Cited

U.S. PATENT DOCUMENTS

| 2,806,544 | A | 9/1957 | Witchey |
| 4,715,219 | A | 12/1987 | Frederiksen |
| 5,136,656 | A | 8/1992 | Frederiksen et al. |
| 8,336,670 | B2 | 12/2012 | Viehmann et al. |
| 2007/0223730 | A1 | 9/2007 | Hickling |
| 2010/0290634 | A1 | 11/2010 | Schaule et al. |
| 2011/0243341 | A1 | 10/2011 | Burnett |
| 2011/0243351 | A1 | 10/2011 | Ueno et al. |
| 2012/0243697 | A1 | 9/2012 | Frye |

FOREIGN PATENT DOCUMENTS

| CH | 224247 | 11/1942 |
| DE | 277575 | 4/1990 |
| DE | 19623715 | 10/1997 |
| EP | 1725073 | 11/2006 |
| GB | 1117723 | 6/1968 |
| JP | 8189858 | 7/1996 |
| JP | 2002217216 | 8/2002 |
| SU | 623273 | 9/1978 |
| WO | 2010026724 | 11/2010 |

OTHER PUBLICATIONS

International Search Report and Written Opinion for Application No. PCT/US2013/059273 dated Dec. 16, 2013 (11 pages).

*Primary Examiner* — Joseph Saunders, Jr.
(74) *Attorney, Agent, or Firm* — Michael Best & Friedrich LLP

(57) ABSTRACT

A microphone test fixture. The test fixture includes a test chamber, an acoustic source, a reference microphone, and an acoustic resistor. The acoustic source is configured to produce sound waves in the test chamber. The reference microphone is positioned to receive the sound waves in the test chamber. The acoustic resistor forms a contiguous space with the test chamber, and is sized to prevent resonances and echoes of the sound waves for a fixed high frequency limit.

17 Claims, 14 Drawing Sheets

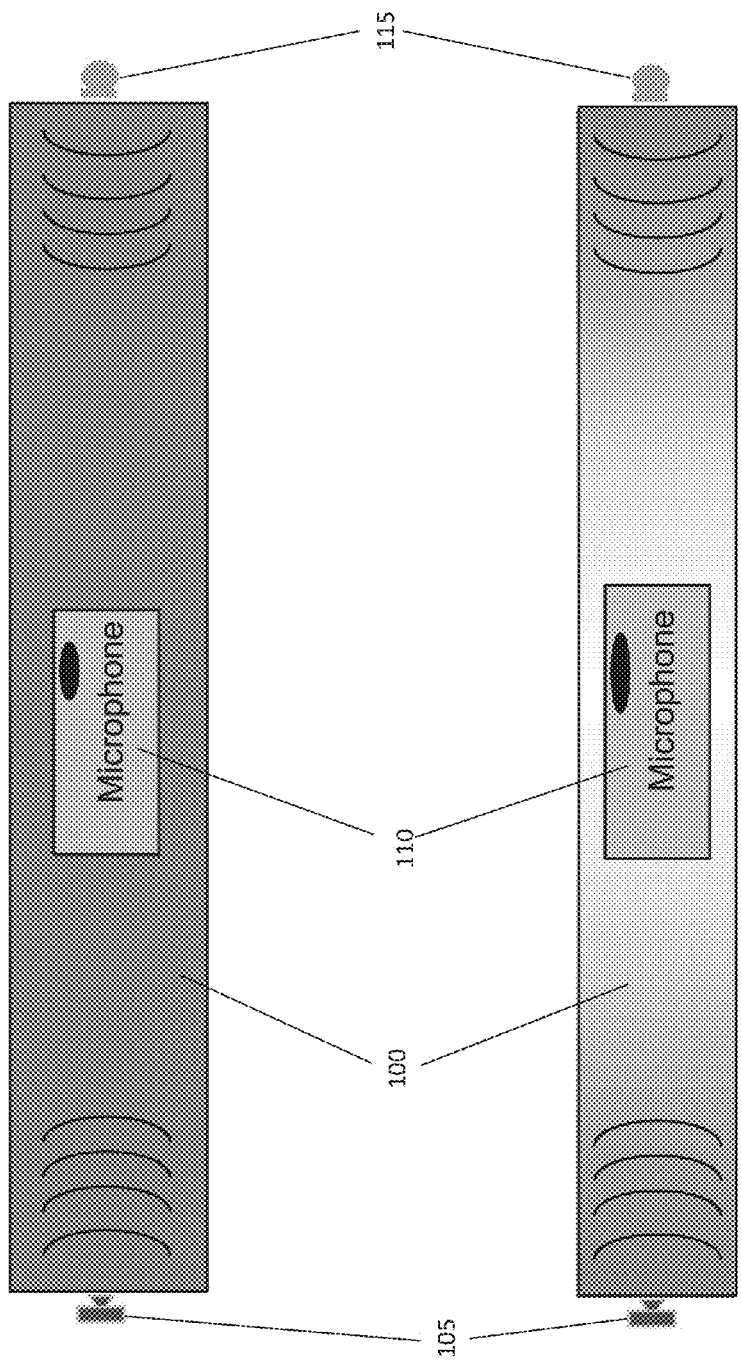

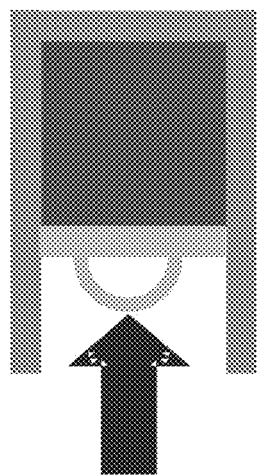
*Fig. 4A*
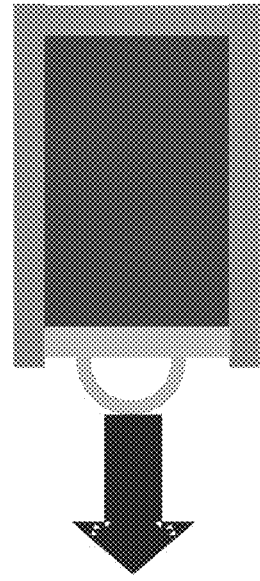
*Fig. 4B*
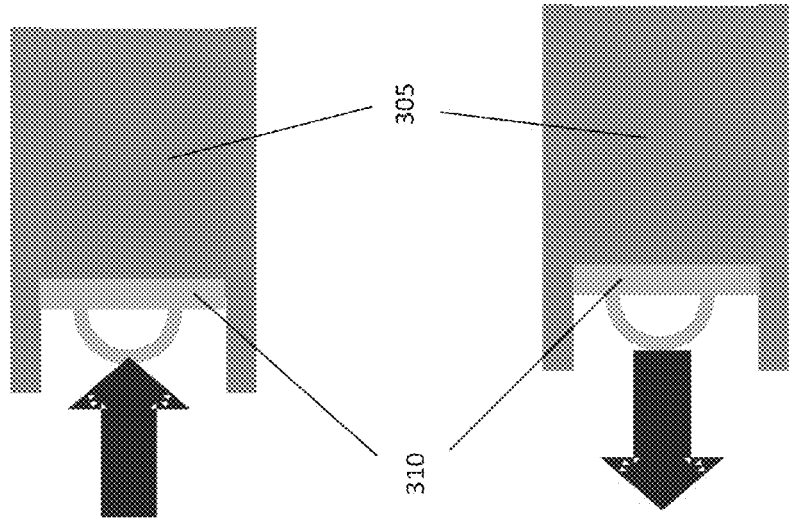

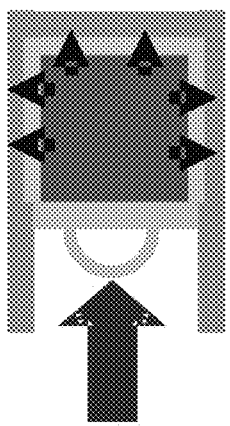
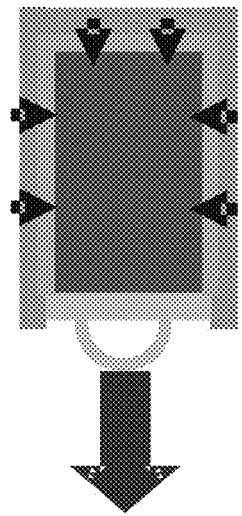
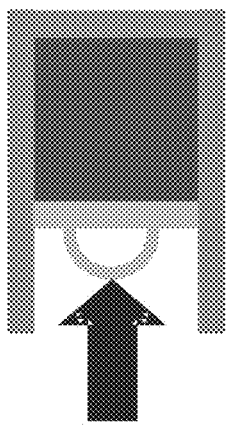
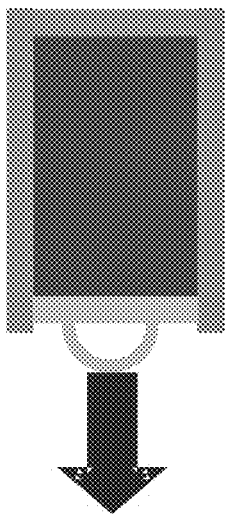
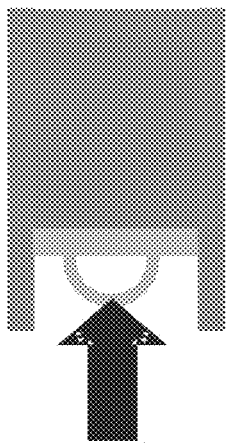
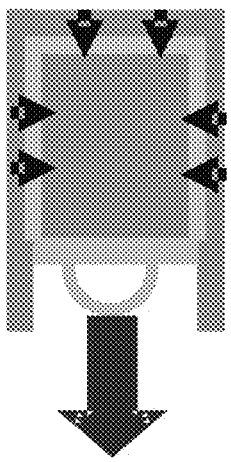
Fig. 5A
Fig. 5B

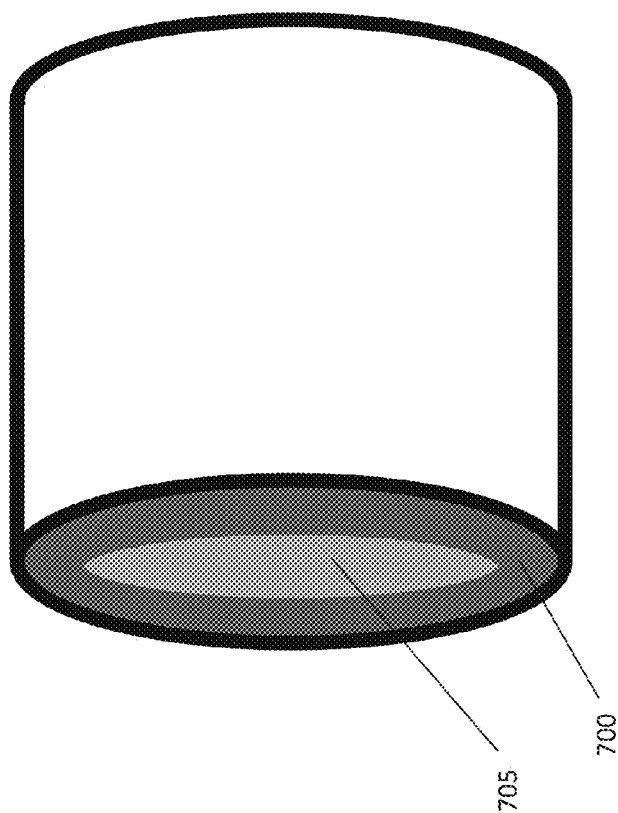
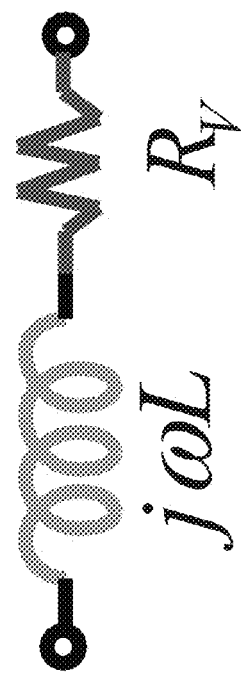
Fig. 7A
Fig. 7B

MICROPHONE TEST FIXTURE

RELATED APPLICATION

The present patent application claims the benefit of prior filed U.S. Provisional Patent Application No. 61/701,127, filed on Sep. 14, 2012, the entire content of which is hereby incorporated by reference.

BACKGROUND

The present invention relates to a microphone test fixture. Specifically, the present invention relates to a microphone test fixture that removes and eliminates resonant and echoed acoustic waves from a test chamber such that the acoustic pressures are consistent throughout the test chamber.

Acoustic test chambers only work when the device under test and the reference microphone are exposed to the same acoustic pressure. Acoustic resonances due to standing waves in the cavity prevent uniform pressures in the chamber, the frequency at which these non-uniform pressure fields form are dependent on the dimensions and design of the test fixture. These non-uniform pressure fields prevent accurate and repeatable measurements of the acoustic environment.

A typical microphone test chamber has an acoustic source, a test chamber (with all boundaries possessing infinite impedances), and a reference microphone (to determine the pressure that the device under test is experiencing). At least one dimension of the test site, and usually all of the dimensions, is/are longer than the wavelength of sound being measured.

At low frequencies, the cavity size is generally very small compared to the wavelength of the acoustic pressure being tested. The wave travels and reflects the off the walls, but the wavelength prevents the perfect cancelation of the reflected wave.

This is illustrated in FIG. 1. A test chamber 100 includes an acoustic source 105 (e.g., a speaker), a device under test (DUT) 110 (i.e., a microphone), and a reference microphone 115. The consistent shading inside the chamber 100 indicates the acoustic pressure is equal throughout the chamber 100.

However, at higher frequencies, where the wavelength of the acoustic pressure is smaller than the cavity size, the acoustic pressure throughout the cavity is no longer equal. As shown in FIG. 2, acoustic energy leaves the speaker 105 and reflects off the rigid cavity walls, and resonances in the cavity 100 occur. The result is the pressure at the microphone 110 opening is not equal to the source pressure from the speaker 105 or to the pressure at the reference microphone 115. This is indicated by the inconsistent shading throughout the chamber 100.

In the scenario shown in FIG. 2, there is a standing wave mode where there is near zero pressure in the middle of the test chamber 100, and a maximum pressure at the acoustic source 105 and the reference microphone 115. At even higher frequencies, additional resonances occur.

SUMMARY

In one embodiment, the invention provides a microphone test fixture. The test fixture includes a test chamber, an acoustic source, a reference microphone, and an acoustic resistor. The acoustic source is configured to produce sound waves in the test chamber. The reference microphone is positioned to receive the sound waves in the test chamber. The acoustic resistor forms a contiguous space with the test chamber, and is sized to prevent resonances and echoes of the sound waves for a fixed high frequency limit.

BRIEF DESCRIPTION OF THE DRAWINGS

FIG. 1 is an illustration of low frequency acoustic pressure in a microphone test chamber.

FIG. 2 is an illustration of the unequal acoustic pressure that occurs at higher frequencies in the test chamber.

FIG. 4A is a diagram of a test chamber illustrating the acoustic source reducing the volume in the test chamber.

FIG. 4B is a diagram of a test chamber illustrating the acoustic source increasing the volume in the test chamber.

FIG. 5A is a diagram illustrating the heat produced when the volume in the test chamber is reduced.

FIG. 5B is a diagram illustrating the heat lost when the volume in the test chamber increased.

FIG. 7A is a diagram illustrating the real acoustic inertance of the test chamber.

FIG. 7B is a schematic diagram showing the electrical equivalent of the real acoustic inertance in the test chamber.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways.

Figure 3:
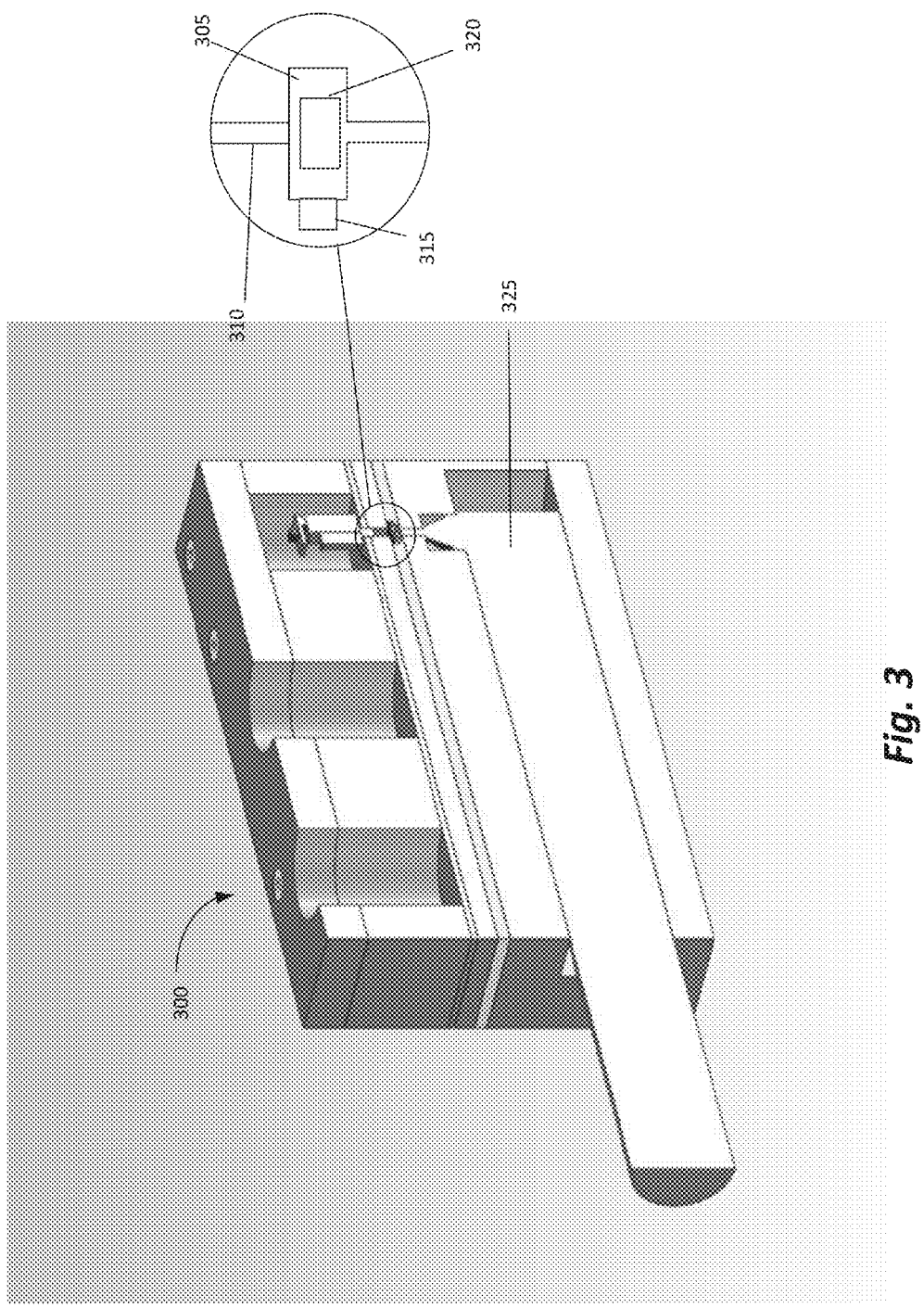
FIG. 3 is a cut-away view of a construction of a microphone test chamber.

FIG. 3 shows a construction of a microphone test fixture 300 incorporating the invention. The test fixture 300 includes a test chamber (cavity) 305, an acoustic source 310, a reference microphone 315, a device under test (DUT) 320 (e.g., a MEMS microphone), and an acoustic resistor 325. The test chamber 305 and the acoustic resistor 325 form a contiguous chamber, and are filled with a fluid (e.g., air, nitrogen, helium, etc.).

The acoustic source 310 emits sound waves (i.e., an acoustic pressure) which are picked up by the reference microphone 315 and the DUT 320. The outputs of the reference microphone 315 and the DUT 320 are compared to test the functioning of the DUT 320. The sound waves emitted by the acoustic source 310 can vary over a range of frequencies (e.g., audible frequencies).

For the test of the DUT 320 to be effective, both the DUT 320 and the reference microphone 315 must receive the same sound waves. However, if the test chamber 305 or the acoustic resistor 325 are not sized correctly, echoing of sound waves can result in the reference microphone 315 and the DUT 320 from receiving different sound waves.

To improve the performance of the test fixture 305, the volume of the test chamber 305 is made as small as possible relative to the DUT 320 to make the test chamber 305 smaller than the wave length of the acoustic waves output by the speaker 310 (see FIG. 1). However, this smaller cavity 305 alone does not solve the problem of uneven acoustic pressures existing in the chamber 305. The small chamber 305 solves the problem for sound waves below a certain frequency but does not solve the problem for higher frequencies (see FIG. 2). In many cases this frequency threshold is still in the audio band where the test remains inaccurate at frequencies where non-uniform pressures are produced in the test chamber 305.

The resonance in the test chamber 305 builds up because the acoustic impedances of all of the cavity walls are infinite. To solve the problem, acoustic impedance (i.e., the acoustic resistor 325) is added (e.g., to one of the walls) resulting in the acoustic energy not reflecting back into the chamber 305, and preventing the resonances.

The acoustic resistor 325, in addition to having acoustic impedance, also has potential energy and kinetic energy storage. To be effective, the acoustic resistor 325 needs to be sized correctly to eliminate the potential energy and kinetic energy storage.

Acoustic pressures in pipes are analogous to Voltage in wire. Acoustic volume velocities are analogous to current in a wire. We can use these relationships to describe the propagation of an acoustic wave through a pipe using electrical analogies. In addition potential energy storage (acoustic compliance) is analogous to an electrical capacitor, and kinetic energy storage (acoustic inertance) is analogous to an electrical inductor.

Acoustic compliance is determined by the formula:

$$C = \frac{V}{\gamma p_m}$$

where:
V=active volume [m3]
γ=cp/cv ratio of specific heats
$p_m = P_o$ ambient pressure [Pa]

FIG. 4A shows the acoustic source 310 reducing the volume in the chamber 305 and FIG. 4B shows the acoustic source 310 increasing the volume in the chamber 305 (e.g., the vibration of a speaker cone). When the volume is reduced heat is created and when the volume is increased heat is removed. With ideal conditions, the walls of the chamber 305 do not allow heat to enter or leave the operating fluid.

Figure 5C:
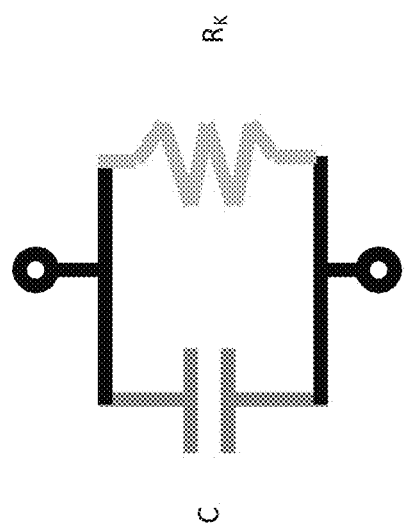
FIG. 5C is a schematic diagram showing the electrical equivalent of the acoustic compliance in the test chamber.
Figure 6:
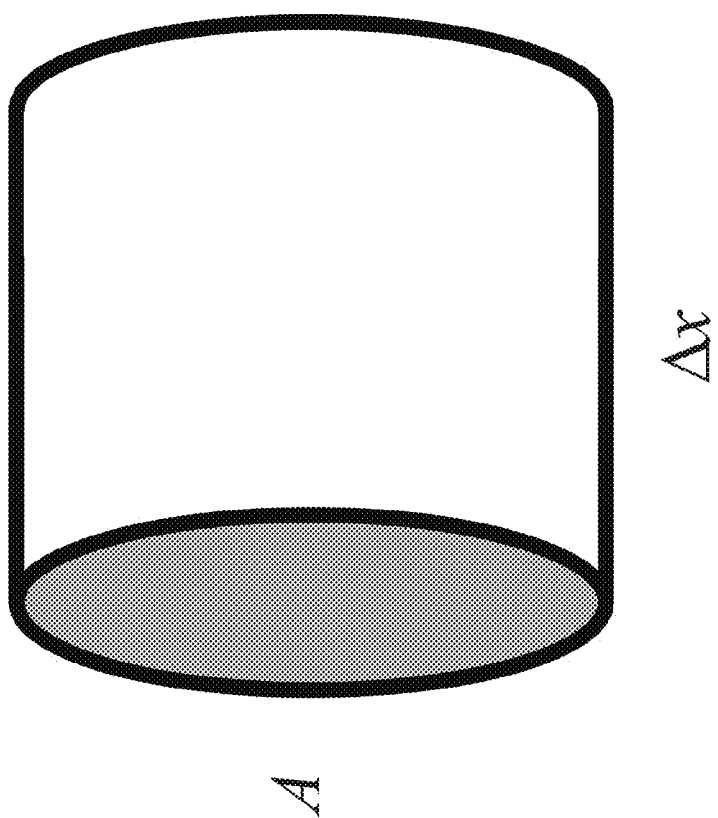
FIG. 6 is a diagram illustrating the ideal acoustic inertance of the test chamber.

However, in reality, the walls of the chamber 305 do allow heat to enter and leave the fluid. As shown in FIG. 5A, as the acoustic source 310 reduces the volume in the chamber 305, heat is produced and some of the heat is absorbed by the walls of the chamber 305. FIG. 5B shows the acoustic source 310 increasing the volume in the chamber 305 causing the fluid to absorb some heat from the walls of the chamber 305. This transfer of heat, however, is not perfect. The amount of heat absorbed by the walls of the tube and the amount of heat returned to the fluid are not equal. Therefore, instead of ideal acoustic compliance (i.e., a capacitor), the real acoustic compliance includes an impedance $R_K$ as shown in FIG. 5C. The impedance $R_K$ component is determined by the formula:

$$R_K = \frac{2\gamma p_m}{\omega(\gamma-1)\Pi\Delta x \delta_k(\omega^{-.5})}$$

where:
Π=wetted surface area of wall (cross section Area×length)
ω=radian frequency
$\delta_k(\omega^{-0.5})$=thermal penetration depth
K=thermal conductivity of material
Cp=specific heat at constant pressure
Vm=molar volume Acoustic inertance (FIG. 6), represented by the analogous inductor, is determined by the formula:

$$L = \frac{\rho \Delta x}{A}$$

where:
ρ=density
Δx=effective length
A=cross sectional area

However, in reality as shown in FIG. 7A, the fluid 700 closer to the walls of the chamber 305 "sticks" to the walls and friction between the walls and the fluid, and between fluid 700 close to the walls and fluid 705 in the center of the chamber 305 causes a loss in energy (i.e., an impedance component). Therefore, instead of ideal acoustic inertance (i.e., an inductor), the real acoustic inertance includes an impedance $R_V$ as shown in FIG. 7B. The impedance $R_V$ component is determined by the formula:

$$R_V = \frac{\mu \Pi \Delta x}{A^2 \delta_v(\omega^{-.5})}$$

where:
μ=bulk viscosity
$\delta_v = \sqrt{2\mu/\omega\rho}$
ρ=density

Figure 8A:
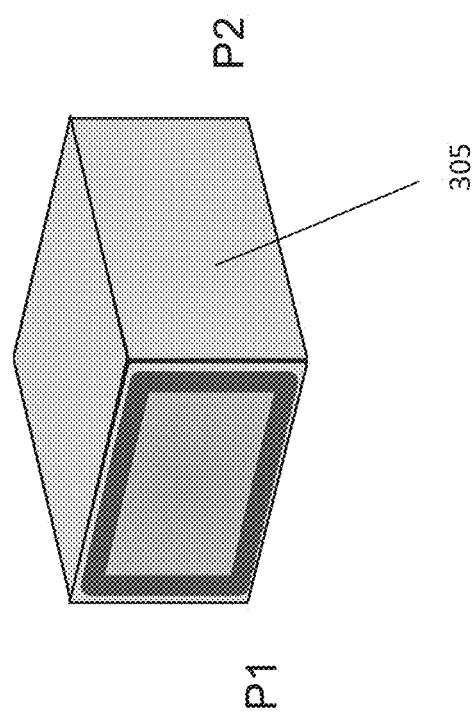
FIG. 8A is a diagram illustrating the real acoustic inertance and the real acoustic compliance of the test chamber.
Figure 8B:
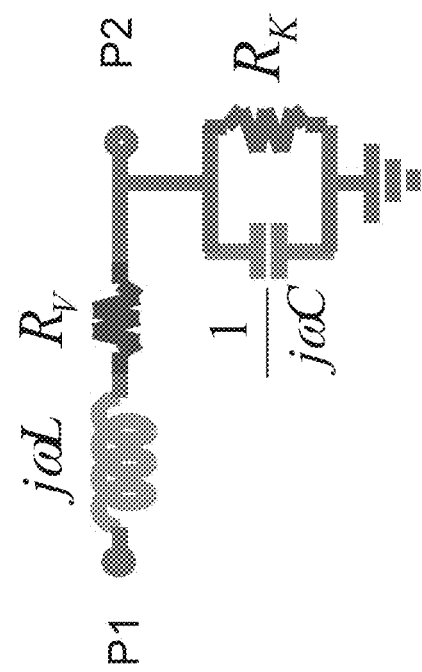
FIG. 8B is a schematic diagram showing the electrical equivalent of the real acoustic inertance and the real acoustic compliance in the test chamber.

FIG. 8A shows a chamber 305 having an input terminal P1 and an output terminal P2. FIG. 8B represent the chamber 305 using the analogous electrical units. The values of the electrical components are determined by the physical dimensions of the chamber 305, the operating frequency, and the parameters of the acoustic fluid in the chamber 305 (e.g., air), and happen simultaneously, but separably, in the chamber 305.

Figure 9:
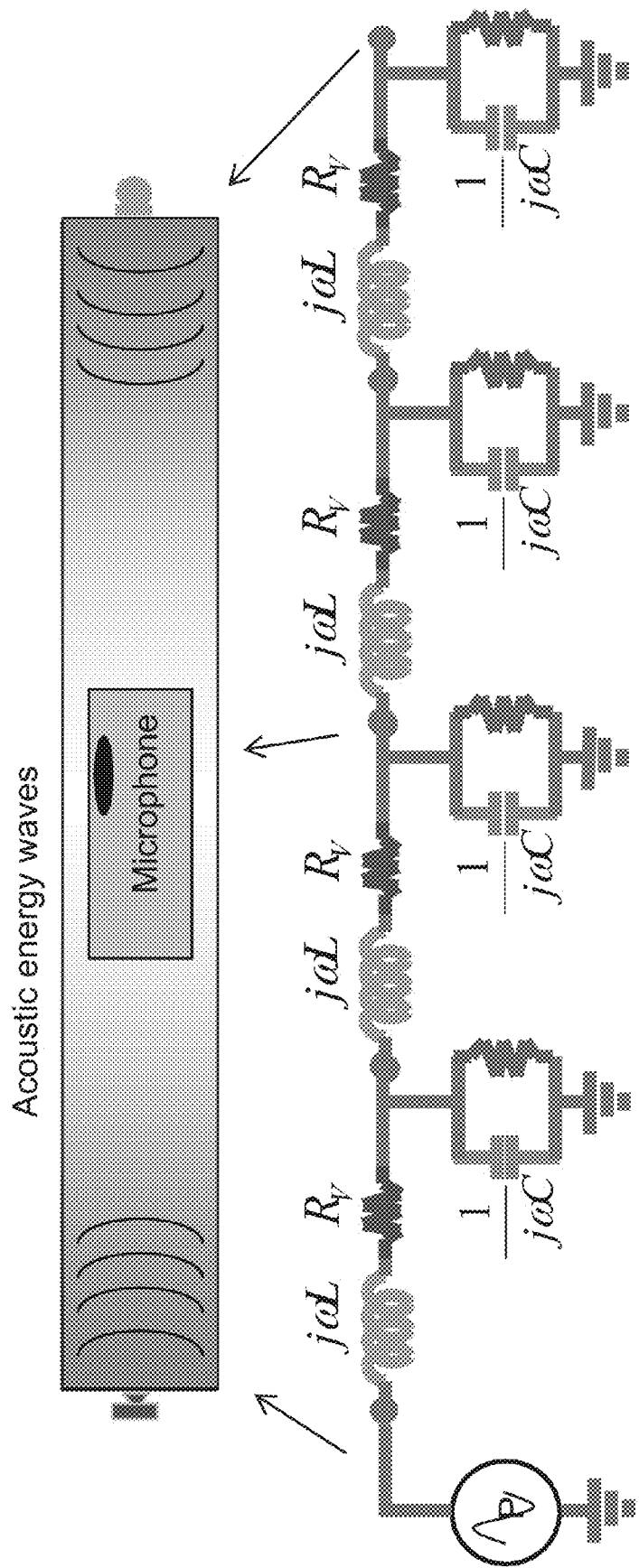
FIG. 9 is a schematic diagram where sections of a test chamber have real compliance and real inertance for different frequencies of acoustic pressures.

Thus, the test chamber 305 of FIG. 2 can be represented as an anologous electrical circuit shown in FIG. 9 where sections of the chamber 305 have real compliance and real inertance for different frequencies of acoustic pressures.

Figure 10:
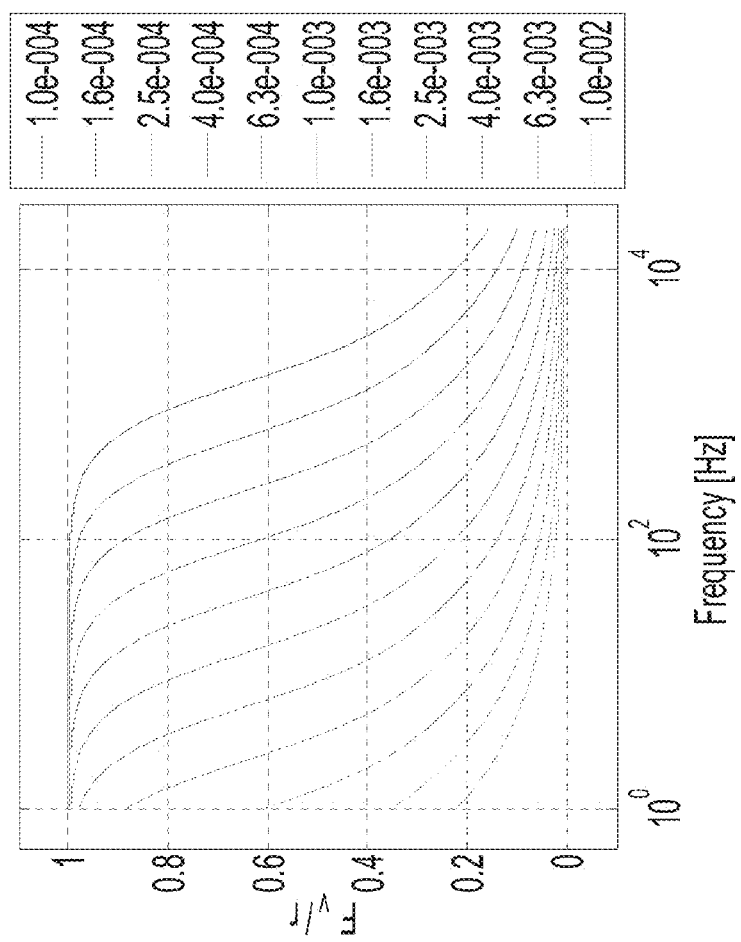
FIG. 10 is a graph showing the inductive component of the real compliance for various frequencies as the diameter of the test chamber is decreased.
Figure 11:
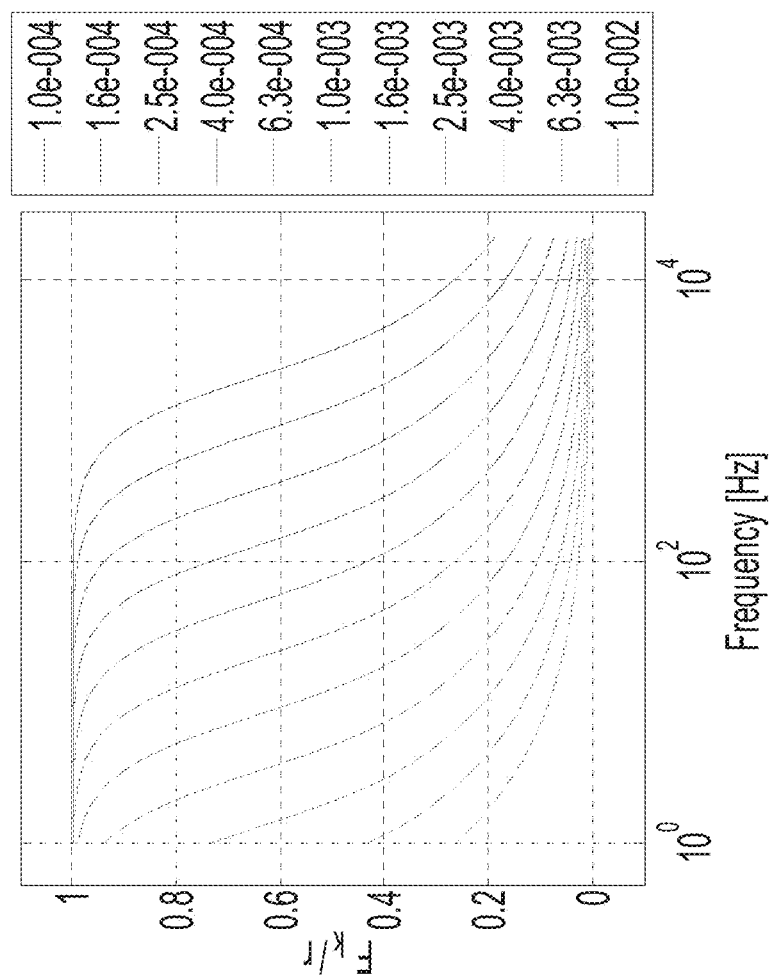
FIG. 11 is a graph showing the capacitive component of the real inertance for various frequencies as the diameter of the test chamber is decreased.
Figure 12:
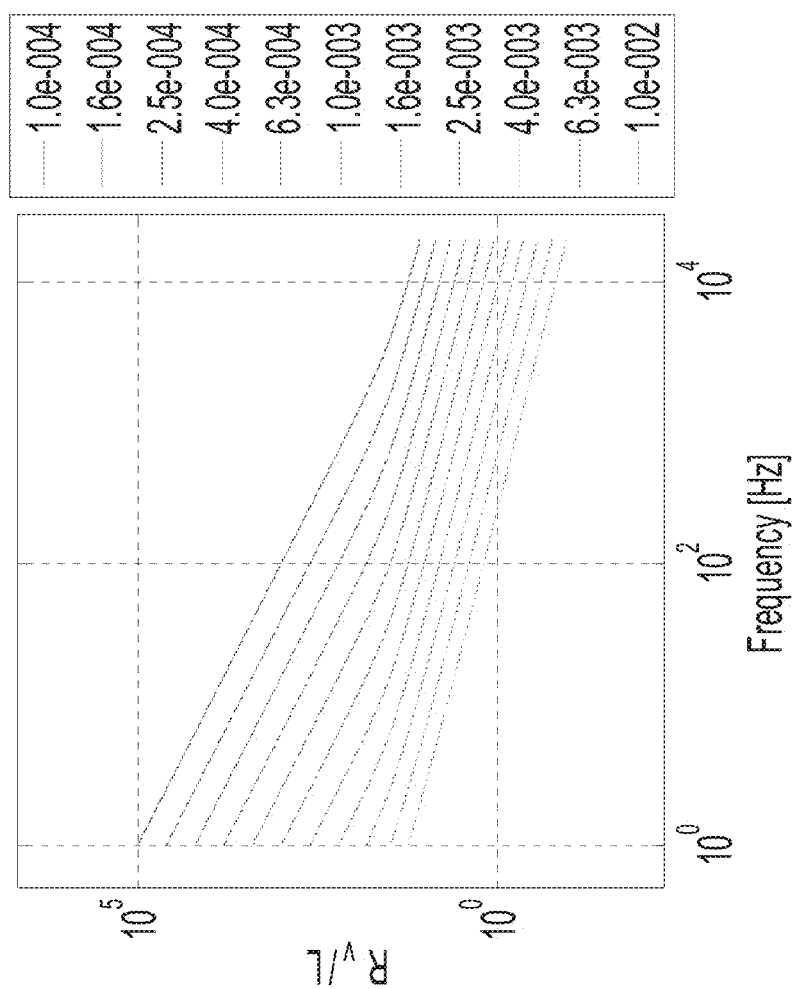
FIG. 12 is a graph showing the resulting change in the relationship of the resistive components to the inductance components as the diameter of the test chamber is decreased.
Figure 13:
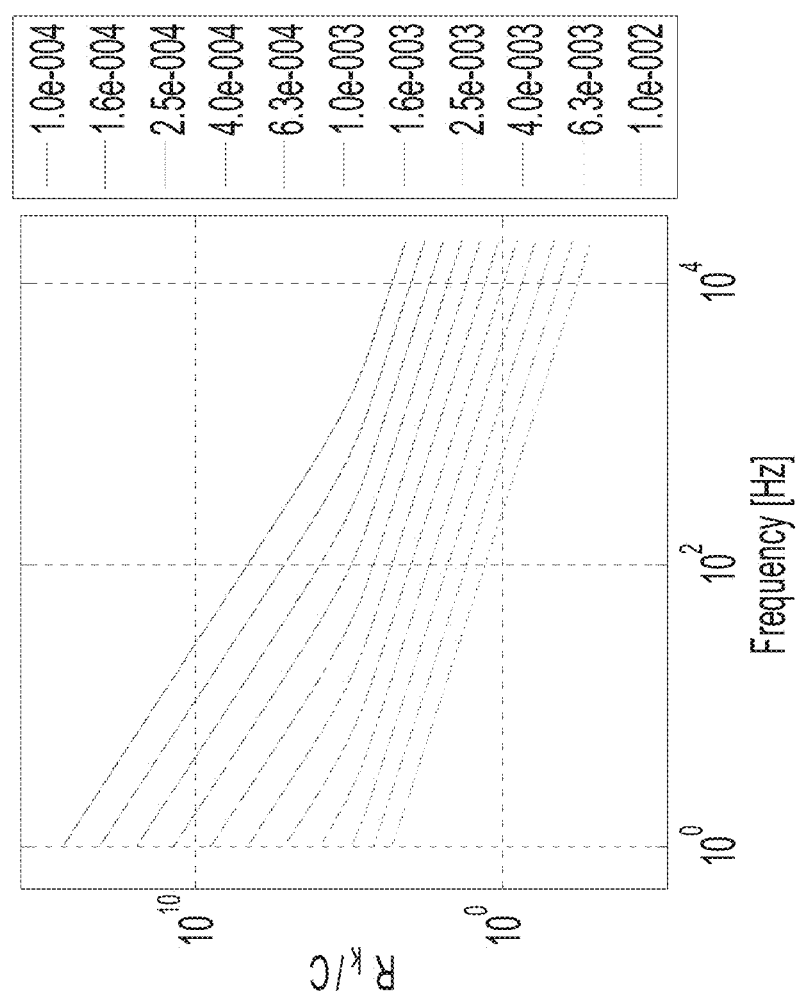
FIG. 13 is a graph showing the resulting change in the relationship of the resistive components to the capacitive components as the diameter of the test chamber is decreased.

FIG. 10 shows the inductive component of the real compliance for various frequencies as the diameter of the chamber 305 is decreased. FIG. 11 shows the capacitive component of the real inertance for various frequencies as the diameter of the chamber 305 is decreased. As can be seen in both graphs, as the diameter of the chamber 305 is decreased, the inductive and capacitive components are reduced. FIGS. 12 and 13 show the resulting change in the relationship of the resistive components to the inductance and capacitance components as the diameter of the chamber 305 is decreased. As shown in FIG. 12, the resistive component $R_V$ has up to five orders of magnitude greater impact than the inductive component (effectively eliminating the inductive component). Similarly, as shown in FIG. 13, the resistive component $R_K$ has up to ten orders of magnitude greater impact than the capacitive component (effectively eliminating the capacitive component).

Figure 14:
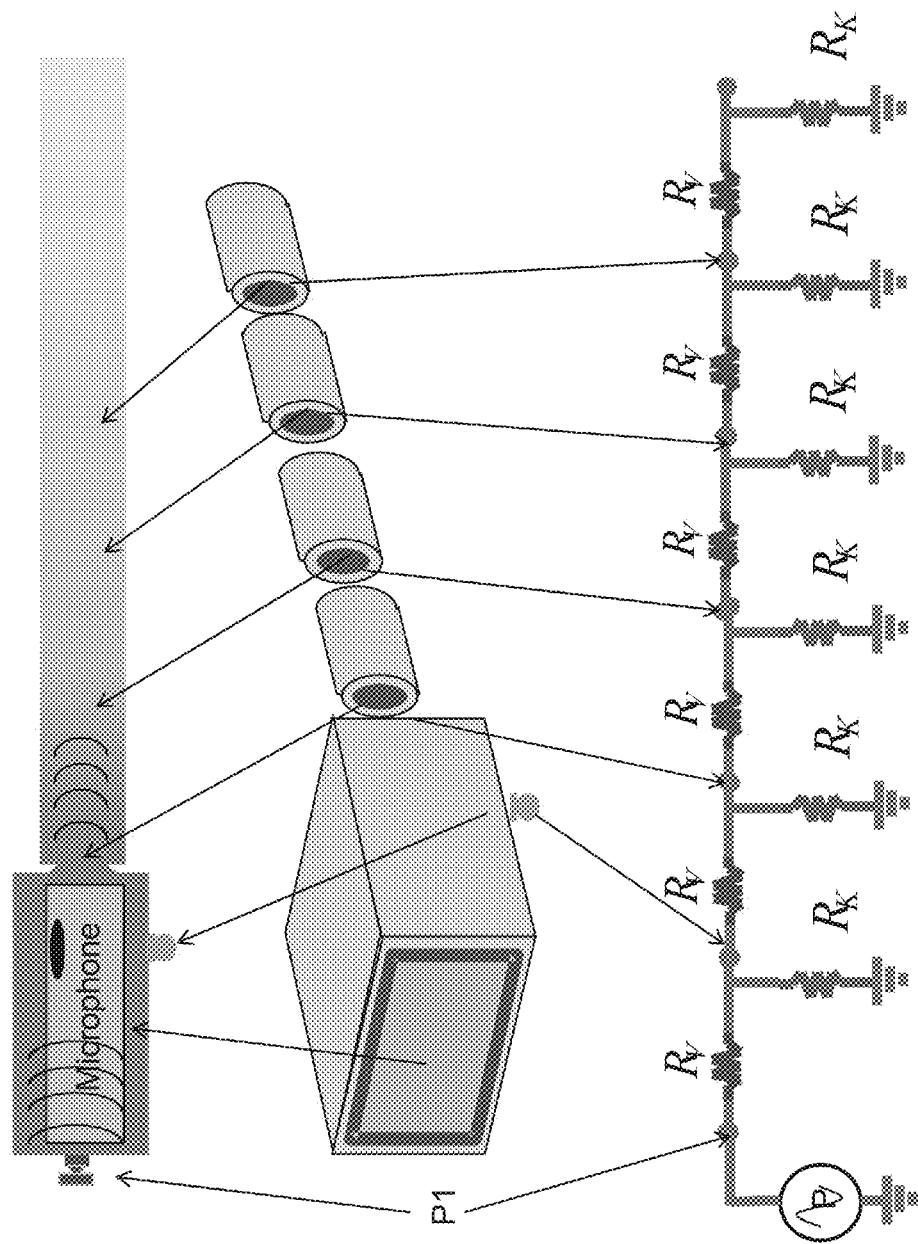
FIG. 14 illustrates that properly sizing the test chamber results in an acoustic resistor at all desired frequencies.

Recognizing that resonances only occur when there are components that store energy in the form of potential and kinetic energy, we can reduce the tube dimension based on the highest desired frequency so that the capacitive and inductive components are greatly reduced relative to the resistive components (i.e., effectively leaving only the resistive components). Thus, by properly sizing the chamber 305, the chamber 305 becomes an acoustic resistor as represented by the analogous circuit shown in FIG. 14. The reference microphone 315 can be placed right where the inductor and capacitor would have been in the acoustic circuit. There are no resonating devices left and the pressure along any portion of the acoustic system is dependent on only one frequency independent value.

Various features and advantages of the invention are set forth in the following claims.

What is claimed is:

1. A microphone test fixture, the test fixture comprising:
 a test chamber;
 an acoustic source configured to produce sound waves in the test chamber;
 a reference microphone positioned to receive the sound waves in the test chamber; and
 an acoustic resistor forming a contiguous space with the test chamber,
 wherein the acoustic resistor is sized to prevent resonances and echoes of the sound waves for a fixed high frequency limit, and
 wherein the acoustic resistor has an acoustic compliance that includes a resistive component and a capacitive component, the capacitive component being a potential energy storage, wherein the acoustic resistor is sized such that the acoustic compliance resistive component exceeds the acoustic compliance capacitive component for the maximum frequency limit.

2. The test fixture of claim 1, wherein the test chamber is sized to contain a device under test and accommodate the reference microphone and the acoustic source.

3. The test fixture of claim 1, wherein the contiguous space contains a fluid.

4. The test fixture of claim 3, wherein the fluid is air.

5. The test fixture of claim 1, wherein the capacitive component is defined by the equation:

$$C = \frac{V}{\gamma \rho_m}$$

where:
V=active volume [m3]
$\gamma$=cp/cv ratio of specific heats
$p_m=P_o$ ambient pressure [Pa].

6. The test fixture of claim 1, wherein the acoustic compliance resistive component is defined by the equation:

$$R_K = \frac{2\gamma \rho_m}{\omega(\gamma-1)\Pi \Delta x \delta_k (\omega^{-.5})}$$

where:
$\Pi$=wetted surface area of wall (cross section Area×length)
$\omega$=radian frequency
$\delta_k (\omega^{-0.5})$=thermal penetration depth
K=thermal conductivity of material
Cp=specific heat at constant pressure
Vm=molar volume
$\gamma$=cp/cv ratio of specific heats
$p_m=P_o$ ambient pressure [Pa].

7. The test fixture of claim 1, wherein the acoustic resistor has an acoustic inertance that includes a resistive component and an inductive component, the inductive component being a kinetic energy storage, wherein the acoustic resistor is sized such that the acoustic inertance resistive component exceeds the acoustic inertance inductive component for the maximum frequency limit.

8. The test fixture of claim 1, wherein the acoustic pressures received by the device under test and the reference microphone are the same.

9. The test fixture of claim 1, wherein the acoustic resistor is a tube.

10. The test fixture of claim 9, wherein the tube is cylindrical.

11. The test fixture of claim 1, wherein the test chamber is a cube.

12. The test fixture of claim 1, wherein the test chamber is a cuboid.

13. The test fixture of claim 1, wherein the test chamber is a tube.

14. The test fixture of claim 13, wherein the test chamber has a diameter greater than a diameter of the acoustic resistor.

15. A microphone test fixture, the test fixture comprising:
 a test chamber;
 an acoustic source configured to produce sound waves in the test chamber;
 a reference microphone positioned to receive the sound waves in the test chamber; and
 an acoustic resistor forming a contiguous space with the test chamber,
 wherein the acoustic resistor is sized to prevent resonances and echoes of the sound waves for a fixed high frequency limit, and
 wherein the acoustic resistor has an acoustic inertance that includes a resistive component and an inductive component, the inductive component being a kinetic energy storage, wherein the acoustic resistor is sized such that the acoustic inertance resistive component exceeds the acoustic inertance inductive component for the maximum frequency limit.

16. The test fixture of claim 15, wherein the inductive component is defined by the equation:

$$L = \frac{\rho \Delta x}{A}$$

where:
$\rho$=density
$\Delta x$=effective length
A=cross sectional area.

17. The test fixture of claim 15, wherein the acoustic inertance resistive component is defined by the equation:

$$R_V = \frac{\mu \Pi \Delta x}{A^2 \delta_v (\omega^{-.5})}$$

where:
μ=bulk viscosity
$\delta_v = \sqrt{2\mu/\omega\rho}$
ρ=density
Δx=effective length
A=cross sectional area
Π=wetted surface area of wall (cross section Area×length)
ω=radian frequency.

* * * * *